US012322349B2

(12) United States Patent
Jung et al.

(10) Patent No.: US 12,322,349 B2
(45) Date of Patent: Jun. 3, 2025

(54) DATA DRIVING CIRCUIT AND DISPLAY DEVICE

(71) Applicant: LG Display Co., Ltd., Seoul (KR)

(72) Inventors: Jinhee Jung, Paju-si (KR); MooKyoung Hong, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 17/895,958

(22) Filed: Aug. 25, 2022

(65) Prior Publication Data

US 2022/0415266 A1 Dec. 29, 2022

Related U.S. Application Data

(62) Division of application No. 17/544,792, filed on Dec. 7, 2021, now Pat. No. 11,450,284.

(30) Foreign Application Priority Data

Dec. 14, 2020 (KR) ........................ 10-2020-0173964

(51) Int. Cl.

*G09G 3/3291* (2016.01)
*G09G 3/00* (2006.01)
*G09G 3/3233* (2016.01)

(52) U.S. Cl.

CPC ........... *G09G 3/3291* (2013.01); *G09G 3/006* (2013.01); *G09G 3/3233* (2013.01); *G09G 2310/08* (2013.01); *G09G 2320/029* (2013.01); *G09G 2320/043* (2013.01); *G09G 2320/045* (2013.01); *G09G 2320/0626* (2013.01); *G09G 2330/021* (2013.01); *G09G 2330/12* (2013.01)

(58) Field of Classification Search

None

See application file for complete search history.

(56) References Cited

U.S. PATENT DOCUMENTS

2011/0205250 A1* 8/2011 Yoo ...................... G09G 3/3233 345/77
2014/0022289 A1 1/2014 Lee et al.
2015/0179107 A1 6/2015 Kim
2015/0379909 A1 12/2015 Yu et al.
2017/0287390 A1 10/2017 Lee et al.
2017/0294159 A1 10/2017 Lee et al.
2017/0301286 A1 10/2017 Xiang et al.
(Continued)

FOREIGN PATENT DOCUMENTS

CN 105741784 A 7/2016
CN 106486059 A 3/2017
(Continued)

*Primary Examiner* — Benjamin C Lee
*Assistant Examiner* — Emily J Frank
(74) *Attorney, Agent, or Firm* — Seed IP Law Group LLP

(57) ABSTRACT

Two or more sensing switches are included in a sensing unit for detecting a characteristic value of a subpixel, and are electrically coupled to a reference voltage line. The two or more sensing switches share a sampling switch with a sensing capacitor included in the sensing unit, which reduces size of the sensing unit. Sensing may include driving simultaneously two or more sensing switches sharing a sensing capacitor, or sensing may be performed through continuous and short driving after simultaneous driving. Overall sensing time can be reduced and sensing accuracy improved.

11 Claims, 13 Drawing Sheets

(56) References Cited

U.S. PATENT DOCUMENTS

| | | | | |
|---|---|---|---|---|
| 2018/0083078 | A1 | 3/2018 | Park et al. | |
| 2018/0137819 | A1 | 5/2018 | An et al. | |
| 2018/0174522 | A1 | 6/2018 | Lee et al. | |
| 2020/0013320 | A1 * | 1/2020 | Yamamoto | G09G 3/32 |
| 2020/0202777 | A1 | 6/2020 | Lee et al. | |
| 2021/0043148 | A1 * | 2/2021 | Lee | G09G 3/3291 |
| 2022/0036818 | A1 * | 2/2022 | Yin | G09G 3/3233 |
| 2022/0180817 | A1 * | 6/2022 | Kim | G09G 3/3233 |

FOREIGN PATENT DOCUMENTS

| | | | |
|---|---|---|---|
| KR | 10-2014-0013146 | A | 2/2014 |
| KR | 10-2015-0073340 | A | 7/2015 |
| KR | 20170062575 | A | 6/2017 |
| KR | 10-2017-0114211 | A | 10/2017 |
| KR | 10-2017-0116293 | A | 10/2017 |
| KR | 10-2018-0032739 | A | 4/2018 |
| KR | 20190005019 | A | 1/2019 |

* cited by examiner

DATA DRIVING CIRCUIT AND DISPLAY DEVICE

CROSS REFERENCE TO RELATED APPLICATION

This application claims priority from Korean Patent Application No. 10-2020-0173964, filed on Dec. 14, 2020, which is hereby incorporated by reference for all purposes as if fully set forth herein.

BACKGROUND

Technical Field

The present disclosure relates to a data driving circuit and a display device.

Description of the Related Art

The growth of the information society leads to increased demand for display devices to display images and use of various types of display devices, such as liquid crystal display devices, organic light emitting display devices, etc.

Among such display devices, the organic light emitting display device utilizes an organic light emitting diode emitting light by itself, which may have advantages of rapid response speed, excellent contrast ratio and high color reproduction.

The organic light emitting display device may include, for example, an organic light emitting diode disposed in each subpixels, and a driving transistor for supplying a driving current to the organic light emitting diode.

Over time, use of the organic light emitting display device increases, and circuit elements such as organic light emitting diodes and driving transistors disposed in subpixels may deteriorate.

BRIEF SUMMARY

The inventors have realized that accurate control of driving of the subpixel is increasingly difficult as the deterioration of the circuit element disposed in the subpixel progresses. If the driving of the subpixels is not accurately controlled, quality of an image displayed through the display panel may be reduced.

Embodiments of the present disclosure compensate for deterioration of a circuit element by reducing the size of a circuit that detects deterioration of one or more circuit elements disposed in a subpixel.

Embodiments of the present disclosure compensate for deterioration of circuit elements with high accuracy while reducing the period for detecting deterioration of circuit elements arranged in subpixels.

In one aspect, embodiments of the present disclosure may provide a display device including a plurality of subpixels disposed on a display panel, a plurality of reference voltage lines electrically coupled to one or more of the plurality of subpixels, and a data driving circuit for driving the plurality of reference voltage lines.

The data driving circuit may include a plurality of sensing switches electrically coupled to each of the plurality of reference voltage lines, a sensing capacitor electrically coupled to two or more sensing switches included in one sensing group among the plurality of sensing switches, and a sampling switch electrically coupled to the sensing capacitor.

In the data driving circuit, the two or more sensing switches included in the one sensing group may be substantially simultaneously turned on during at least a part of a sensing period for detecting a characteristic value of the subpixel through a reference voltage line electrically coupled to the two or more sensing switches among the plurality of reference voltage lines. Alternatively, the two or more sensing switches included in the one sensing group may be concurrently turned on during at least a part of a sensing period for detecting a characteristic value of the subpixel. As an example, in a first sensing period, the two or more sensing switches included in the one sensing group may be simultaneously turned on or simultaneously turned off.

In the first sensing period, the sampling switch may be turned on immediately after the two or more sensing switches are simultaneously turned off or before being turned off.

In a second sensing period after the first sensing period, one sensing switch among the two or more sensing switches included in the one sensing group may be turned on and the other sensing switch may maintain a turned-off state.

The length of a period in which the one sensing switch maintains a turned-on state in the second sensing period may be shorter than length of a period in which the two or more sensing switches maintain a turned-on state in the first sensing period.

In the second sensing period, the sampling switch may be turned on immediately after the one sensing switch which has been in the turned-on state is turned off or before being in the turned-off state.

In a third sensing period after the second sensing period, one sensing switch among the two or more sensing switches included in the one sensing group may be turned on and the other sensing switches may maintain a turned-off state, and the one sensing switch turned on in the third sensing period may be different from the one sensing switch turned on in the second sensing period.

The length of a period in which the one sensing switch remains in a turned-on state in the third sensing period may be shorter than a length of a period in which the two or more sensing switches remain in a turned-on state in the first sensing period.

A length of a period in which the one sensing switch remains in a turned-on state in the third sensing period may be shorter than a length of a period in which the one sensing switch remains in a turned-on state in the second sensing period.

In the third sensing period, the sampling switch may be turned on immediately after the one sensing switch which has been in the turned-on state is turned off or before being in the turned-off state.

In some embodiments, the two or more sensing switches included in the one sensing group may be turned on at substantially the same time in a first sensing period, and some of the two or more sensing switches may be turned off before the first sensing period ends. Others of the two or more sensing switches may remain in a turned-on state until at least a portion of a second sensing period after the first sensing period.

In accordance with some embodiments, a display device includes a plurality of subpixels disposed on a display panel, a plurality of reference voltage lines electrically coupled to some of the plurality of subpixels, and a data driving circuit for driving the plurality of reference voltage lines. The data driving circuit may include a first sensing switch electrically coupled to a first reference voltage line among the plurality of reference voltage lines and a second sensing switch electrically coupled to a second reference voltage line, a sensing capacitor electrically coupled to the first sensing switch and the second sensing switch, and a sampling switch electrically coupled to the sensing capacitor.

The data driving circuit may detect a characteristic value of the subpixel through the first reference voltage line when the first sensing switch is turned on in a first sensing period, and may detect the characteristic value of the subpixel through the second reference voltage line when the second sensing switch is turned on in a second sensing period.

In a display driving period between the first sensing period and the second sensing period, a compensation voltage determined based on the characteristic value of the subpixel detected through the first reference voltage line may be supplied to the subpixel electrically coupled to the first reference voltage line and the subpixel electrically coupled to the second reference voltage line.

Embodiments of the present disclosure may provide a data driving circuit including a plurality of sensing switches electrically coupled to each of a plurality of reference voltage lines, a sensing capacitor electrically coupled to two or more sensing switches included in one sensing group among the plurality of sensing switches, and a sampling switch electrically coupled to the sensing capacitor, wherein the two or more sensing switches included in the one sensing group are simultaneously or concurrently turned on during at least a part of a sensing period for detecting a characteristic value of a subpixel through a reference voltage line electrically coupled to the two or more sensing switches among the plurality of reference voltage lines.

According to embodiments of the present disclosure, it is possible to reduce the size of the circuit and detect the characteristic value of the subpixel by using a configuration in which a single sensing capacitor is shared by two or more sensing switches, of which a sensing switch is coupled to a reference voltage line used to detect a characteristic value of a circuit element disposed in the subpixel.

According to embodiments of the present disclosure, a plurality of sensing switches sharing a sensing capacitor are turned on at the same time and detect the characteristic value of the subpixel, thereby reducing the sensing time used in detecting the characteristic value of the subpixel.

In some embodiments, a first sensing is performed in a state in which a plurality of sensing switches sharing a sensing capacitor are turned on at substantially the same time, and a second sensing is performed in a state in which one sensing switch is turned on, such that overall sensing time is reduced and sensing accuracy is increased.

DETAILED DESCRIPTION

Figure 1:
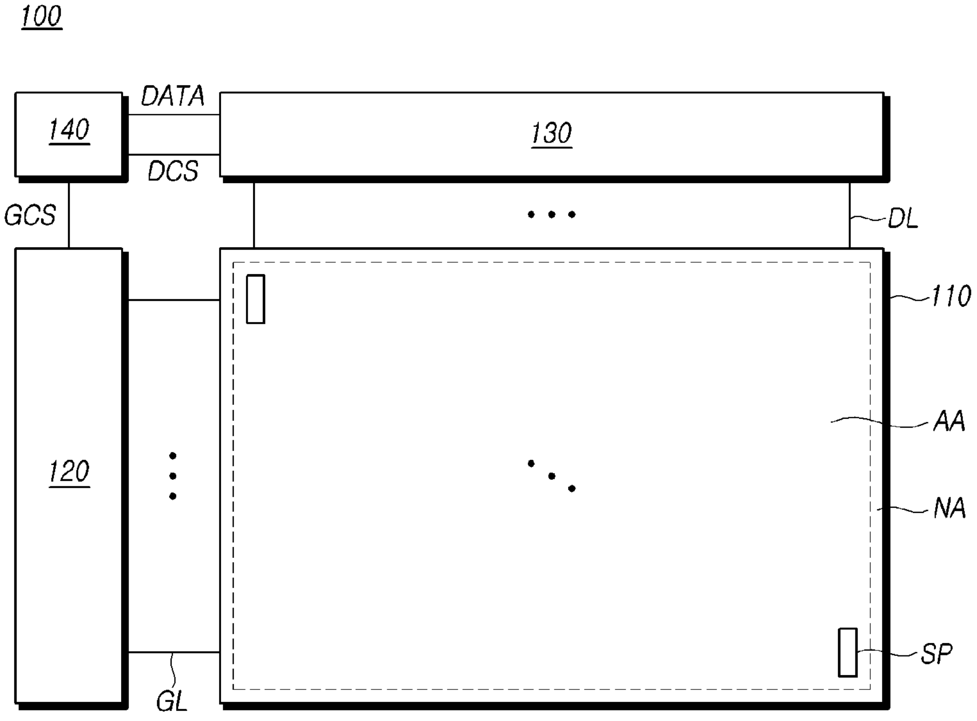
FIG. 1 schematically illustrates a configuration of a display device according to embodiments of the present disclosure.

In the following description of examples or embodiments of the present disclosure, reference will be made to the accompanying drawings in which it is shown by way of illustration specific examples or embodiments that can be implemented, and in which the same reference numerals and signs can be used to designate the same or like components even when they are shown in different accompanying drawings from one another. Further, in the following description of examples or embodiments of the present disclosure, detailed descriptions of well-known functions and components incorporated herein will be omitted when it is determined that the description may make the subject matter in some embodiments of the present disclosure rather unclear. The terms such as "including," "having," "containing," "constituting," "make up of," and "formed of" used herein are generally intended to allow other components to be added unless the terms are used with the term "only." As used herein, singular forms are intended to include plural forms unless the context clearly indicates otherwise.

Terms, such as "first," "second," "A," "B," "(A)," or "(B)" may be used herein to describe elements of the present disclosure. Each of these terms is not intended to impart essence, order, sequence, or number to the elements, etc., but is used to distinguish the corresponding element from other elements.

When it is mentioned that a first element "is connected or coupled to," "contacts or overlaps," etc., a second element, it should be interpreted that, not only can the first element "be directly connected or coupled to" or "directly contact or overlap" the second element, but a third element can also be "interposed" between the first and second elements, or the first and second elements can "be connected or coupled to," "contact or overlap," etc., each other via a fourth element. Here, the second element may be included in at least one of two or more elements that "are connected or coupled to," "contact or overlap," etc., each other.

When time relative terms, such as "after," "subsequent to," "next," "before," and the like, are used to describe processes or operations of elements or configurations, or flows or steps in operating, processing, manufacturing methods, these terms may be used to describe non-consecutive or non-sequential processes or operations unless the term "directly" or "immediately" is used together.

In addition, when any dimensions, relative sizes, etc., are mentioned, it should be considered that numerical values for elements or features, or corresponding information (e.g., level, range, etc.) include a tolerance or error range that may be caused by various factors (e.g., process factors, internal or external impact, noise, etc.) even when a relevant description is not specified. Further, the term "may" fully encompasses all the meanings of the term "can".

FIG. 1 schematically illustrates a configuration included in a display device 100 according to embodiments of the present disclosure.

Referring to FIG. 1, the display device 100 may include a display panel 110, a gate driving circuit 120 for driving the display panel 110, a data driving circuit 130, a controller 140, or the like.

The display panel 110 may include an active area AA in which a plurality of subpixels SP are disposed, and a non-active area NA positioned outside the active area AA.

A plurality of gate lines GL and a plurality of data lines DL may be disposed on the display panel 110. The subpixel SP may be positioned in a region where the gate line GL and the data line DL overlap.

The gate driving circuit 120 is controlled by the controller 140. The gate driving circuit 120 can sequentially output scan signals to the plurality of gate lines GL arranged on the display panel 110, thereby controlling the driving timing of the plurality of subpixels SP.

The gate driving circuit 120 may include one or more gate driver integrated circuits GDIC. The gate driving circuit 120 may be located at a single side of the display panel 110, or can be located at both sides thereof according to a driving method.

Each gate driver integrated circuit GDIC may be connected to a bonding pad of the display panel 110 by a tape automated bonding (TAB) method or a chip-on-glass (COG) method. Alternatively, each gate driver integrated circuit GDIC may be implemented as a gate-in-panel (GIP) type and disposed directly on the display panel 110. Alternatively, each gate driver integrated circuit GDIC may be integrated and disposed on the display panel 110 in some cases. Alternatively, each gate driver integrated circuit GDIC may be implemented in a chip-on-film (COF) method mounted on a film connected to the display panel 110.

The data driving circuit 130 may receive data signal from the controller 140 and converts the data signal into an analog data voltage Vdata. The data driving circuit 130 outputs the data voltage Vdata to each data line DL according to the timing at which the scan signal is applied through the gate line GL so that each of the plurality of subpixels SP emits light having brightness according to the data signal.

The data driving circuit 130 may include one or more source driver integrated circuits SDIC.

Each source driver integrated circuit SDIC may include a shift register, a latch circuit, a digital-to-analog converter, an output buffer, and the like.

Each source driver integrated circuit SDIC may be connected to a bonding pad of the display panel 110 by a tape automated bonding (TAB) method or a chip-on-glass (COG) method. Alternatively, each source driver integrated circuit SDIC may be disposed directly on the display panel 110. Alternatively, each source driver integrated circuit SDIC may be integrated and disposed on the display panel 110 in some cases. Alternatively, each source driver integrated circuit SDIC may be implemented in a chip-on-film (COF) manner. In this case, each source driver integrated circuit SDIC may be mounted on a film connected to the display panel 110, and may be electrically connected to the display panel 110 through lines on the film.

The controller 140 may supply various control signals to the gate driving circuit 120 and the data driving circuit 130, and control the operation of the gate driving circuit 120 and the data driving circuit 130.

The controller 140 may be mounted on a printed circuit board or a flexible printed circuit. The controller 140 may be electrically connected to the gate driving circuit 120 and the data driving circuit 130 through a printed circuit board or a flexible printed circuit.

The controller 140 may control the gate driving circuit 120 to output a scan signal according to timing implemented in each frame. The controller 140 may convert externally received image data to match a signal format used by the data driving circuit 130, and output the converted data signal to the data driving circuit 130.

The controller 140 may receive various timing signals including a vertical synchronization signal VSYNC, a horizontal synchronization signal HSYNC, an input data enable signal DE, a clock signal CLK from the outside (e.g., host system).

The controller 140 may generate various control signals by using various timing signals received from the outside, and may output the control signals to the gate driving circuit 120 and the data driving circuit 130.

For example, in order to control the gate driving circuit 120, the controller 140 may output various gate control signals GCS including a gate start pulse GSP, a gate shift clock GSC, and a gate output enable signal GOE.

The gate start pulse GSP controls operation start timing of one or more gate driver integrated circuits GDIC constituting the gate driving circuit 120. The gate shift clock GSC, which is a clock signal commonly input to one or more gate driver integrated circuits GDIC, controls the shift timing of a scan signal. The gate output enable signal GOE specifies timing information on one or more gate driver integrated circuits GDIC.

In addition, in order to control the data driving circuit 130, the controller 140 may output various data control signals DCS including a source start pulse SSP, a source sampling clock SSC, a source output enable signal SOE, or the like.

The source start pulse SSP controls a data sampling start timing of one or more source driver integrated circuits SDIC constituting the data driving circuit 130. The source sampling clock SSC is a clock signal for controlling the timing of sampling data in the respective source driver integrated circuits SDIC. The source output enable signal SOE controls the output timing of the data driving circuit 130.

The display device 100 may further include a power management integrated circuit (not shown) for supplying various voltages or currents to the display panel 110, the gate driving circuit 120, the data driving circuit 130, and the like or controlling various voltages or currents to be supplied thereto.

Each subpixel SP may be a region defined by or including the overlap of the gate line GL and the data line DL, in which at least one circuit element including a light emitting device may be disposed.

For example, in the case that the display device 100 is an organic light emitting display device, an organic light emitting diode OLED and various circuit elements may be disposed in the plurality of subpixels SP. The display device 100 controls the current supplied to the organic light emitting diode OLED disposed in the subpixel SP by driving several circuit elements, so that each subpixel SP may be controlled to display brightness corresponding to image data.

Figure 2:
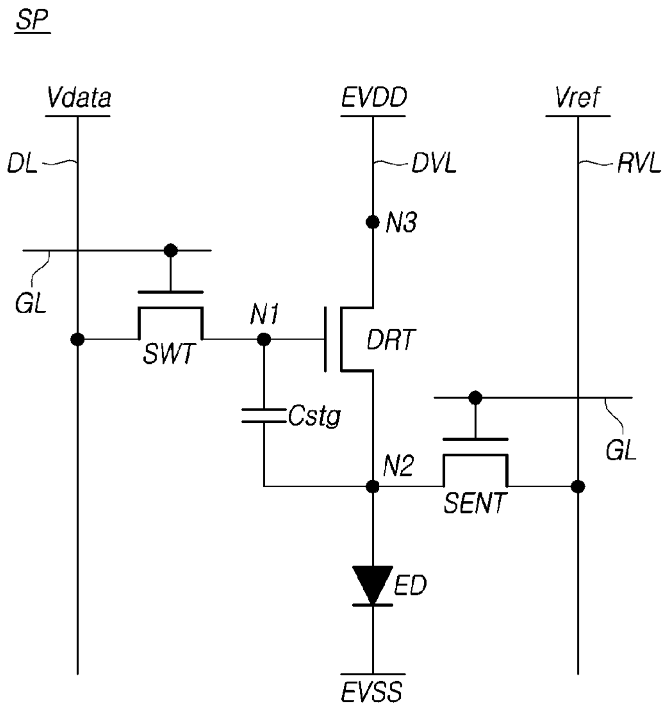
FIG. 2 illustrates an example of a circuit structure of a subpixel included in a display device according to embodiments of the present disclosure.

FIG. 2 illustrates an example of a circuit structure of the subpixel SP included in the display device 100 according to embodiments of the present disclosure.

FIG. 2 illustrates an example of a circuit structure of a subpixel SP in the case that the display device 100 is an organic light emitting display device, but embodiments of the present disclosure may be applied to other types of display devices.

Referring to FIG. 2, a light emitting device ED and a driving transistor DRT for driving the light emitting device ED may be disposed in the subpixel SP. In addition, at least one circuit element other than the light emitting element ED and the driving transistor DRT may be further disposed in the subpixel SP.

For example, as illustrated in FIG. 2, a switching transistor SWT, a sensing transistor SENT, and a storage capacitor Cstg may be further disposed in the subpixel SP.

Accordingly, the example of FIG. 2 illustrates a 3T-1C structure in which three thin film transistors and one capacitor are disposed in addition to the light emitting device ED in the subpixel SP as an example, but embodiments of the present disclosure is not limited thereto. Further, FIG. 2 illustrates the example in which the thin film transistors are all N-type, but in some cases, the thin film transistors disposed in the subpixel SP may be P-type.

The switching transistor SWT may be electrically connected between the data line DL and a first node N1.

The data voltage Vdata may be supplied to the subpixel SP through the data line DL. The first node N1 may be a gate node of the driving transistor DRT.

The switching transistor SWT may be controlled by a scan signal supplied to the gate line GL. The switching transistor SWT may control that the data voltage Vdata supplied through the data line DL is applied to the gate node of the driving transistor DRT.

The driving transistor DRT may be electrically connected between the driving voltage line DVL and the light emitting device ED.

The light emission high potential driving voltage EVDD may be supplied to the third node N3 through the driving voltage line DVL. The third node N3 may be a drain node or a source node of the driving transistor DRT.

The driving transistor DRT may be controlled by a voltage applied to the first node N1. In addition, the driving transistor DRT may control the driving current supplied to the light emitting device ED.

The sensing transistor SENT may be electrically connected between a reference voltage line RVL and a second node N2.

The reference voltage Vref may be supplied to the second node N2 through the reference voltage line RVL. The second node N2 may be a source node or a drain node of the driving transistor DRT.

The sensing transistor SENT may be controlled by a scan signal supplied to the gate line GL. The gate line GL controlling the sensing transistor SENT may be the same as or different from the gate line GL controlling the switching transistor SWT.

The sensing transistor SENT may control that the reference voltage Vref is applied to the second node N2. Also, in some cases, the sensing transistor SENT may control sensing the voltage of the second node N2 through the reference voltage line RVL.

The storage capacitor Cstg may be electrically connected between the first node N1 and the second node N2. The storage capacitor Cstg may maintain the data voltage Vdata applied to the first node N1 for one frame.

The light emitting device ED may be electrically connected between the second node N2 and a line to which the light emission low potential driving voltage EVSS is supplied.

If a scan signal of a turned-on level is applied to the gate line GL, the switching transistor SWT and the sensing transistor SENT may be turned on. The data voltage Vdata may be applied to the first node N1, and the reference voltage Vref may be applied to the second node N2.

A driving current supplied by the driving transistor DRT may be determined according to a difference between the voltage of the first node N1 and the voltage of the second node N2.

The light emitting device ED may exhibit brightness according to the driving current supplied through the driving transistor DRT.

As the driving time of the display device 100 increases, circuit elements such as the driving transistor DRT or the light emitting device ED disposed in the subpixel SP may be deteriorated. If the circuit element deteriorates, the characteristic value of the circuit element may be changed.

The characteristic value of the circuit element may mean, for example, mobility or a threshold voltage of the driving transistor DRT. In addition, the characteristic value of the circuit element may mean a threshold voltage of the light emitting element ED.

In this specification, a characteristic value of a circuit element disposed in the subpixel SP may be referred to as a characteristic value of the subpixel SP.

If the characteristic value of the subpixel SP is changed, it may be difficult to accurately control the driving of the subpixel SP. In addition, a deviation in characteristic values between the subpixels SP may occur.

The quality of an image displayed through the display panel 110 may be deteriorated due to a change in the characteristic value of the subpixel SP.

The display device 100 according to embodiments of the present disclosure may detect a change in the characteristic value of the subpixel SP and perform compensation according to the change in the characteristic value, thereby improving the quality of an image displayed through the display panel 110.

Figure 3:
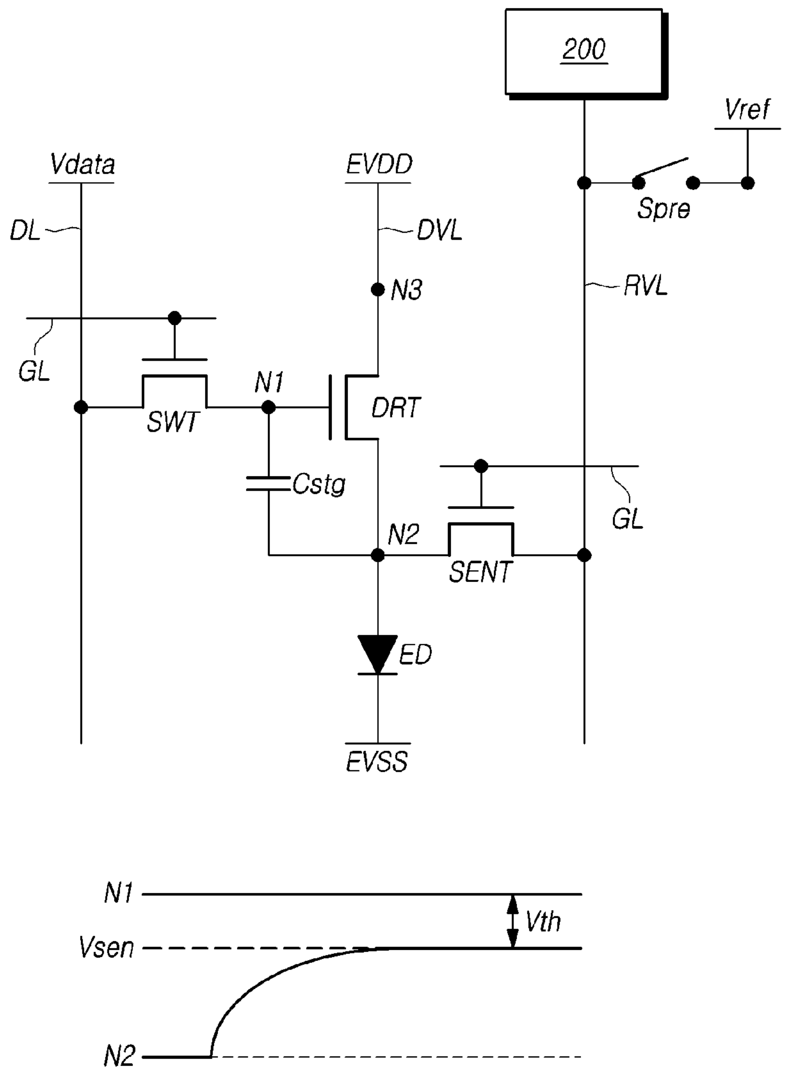
FIG. 3 illustrates an example of a structure for detecting a characteristic value of a subpixel included in a display device according to embodiments of the present disclosure.

FIG. 3 illustrates an example of a structure for detecting a characteristic value of a subpixel SP included in a display device 100 according to embodiments of the present disclosure.

Referring to FIG. 3, the display device 100 may include a sensing unit 200 for detecting a characteristic value of the subpixel SP.

The sensing unit 200, for example, may be located inside the data driving circuit 130. Alternatively, in some cases, the sensing unit 200 may be located outside the data driving circuit 130.

The sensing unit 200 may be electrically coupled to a reference voltage line RVL electrically coupled to the subpixel SP. The sensing unit 200 may detect a characteristic value of the subpixel SP through the reference voltage line RVL.

The sensing unit 200 may detect a characteristic value of the subpixel SP, such as a characteristic value of the driving transistor DRT or the light emitting device ED.

A sensing period during which the sensing unit 200 detects the characteristic value of the subpixel SP may be, for example, immediately after the display device 100 starts driving or immediately after driving is finished. Alternatively, in some cases, the sensing unit 200 may detect the characteristic value of the subpixel SP during a blank period of the display driving period.

It will be described an example in which the sensing unit 200 detects the threshold voltage of the driving transistor DRT among the characteristic values of the subpixel SP. In the sensing period, the data voltage Vdata for sensing may be supplied to the first node N1 of the driving transistor DRT. The reference voltage Vref may be supplied to the second node N2 of the driving transistor DRT during the sensing period.

In order to supply a voltage for sensing to the first node N1 and the second node N2, a switching transistor SWT, a sensing transistor SENT, and a reference voltage control switch Spre are temporarily turned on.

The second node N2 may be in a floating state while voltages are applied to the first node N1 and the second node N2.

When the second node N2 is in the floating state, the voltage of the second node N2 may increase along with the voltage of the first node N1. When a predetermined time or selected time elapses, the voltage of the second node N2 may be in a saturated state. A "saturated state" may refer to a state of a voltage in which the voltage does not continue to increase or decrease substantially over time. For example, in FIG. 3, the voltage of the second node N2 increases from a first voltage to a higher second voltage labeled "Vsen," after which the voltage of the second node N2 does not continue to increase substantially with passing time. The voltage of the second node N2 may be said to be in the "saturated state" after reaching the second voltage labeled "Vsen."

The sensing unit 200 may detect the voltage of the second node N2 that is in the saturated state. Accordingly, the voltage of the second node N2 in the saturated state may be referred as the sensing voltage Vsen.

The sensing unit 200 may detect the threshold voltage of the driving transistor DRT from a difference between the detected sensing voltage Vsen and the data voltage Vdata applied to the first node N1 for sensing.

There may be performed a compensation for deterioration of the driving transistor DRT based on the detected threshold voltage of the driving transistor DRT.

For example, the data driving circuit 130 may supply a voltage obtained by adding a compensation voltage determined based on a detected threshold voltage to the data voltage Vdata corresponding to the image data signal to the subpixel SP. Accordingly, the compensation for a change in the characteristic value of the subpixel SP may be performed to accurately control driving of the subpixel SP, and deterioration of the quality of an image displayed through the display panel 110 can be prevented.

The reference voltage line RVL used to sense the characteristic value of the subpixel SP may be electrically coupled to the subpixels SP disposed in a plurality of lines. It is possible to detect the characteristic value of the subpixel SP while minimizing the number of sensing lines disposed on the display panel 110.

Figure 4:
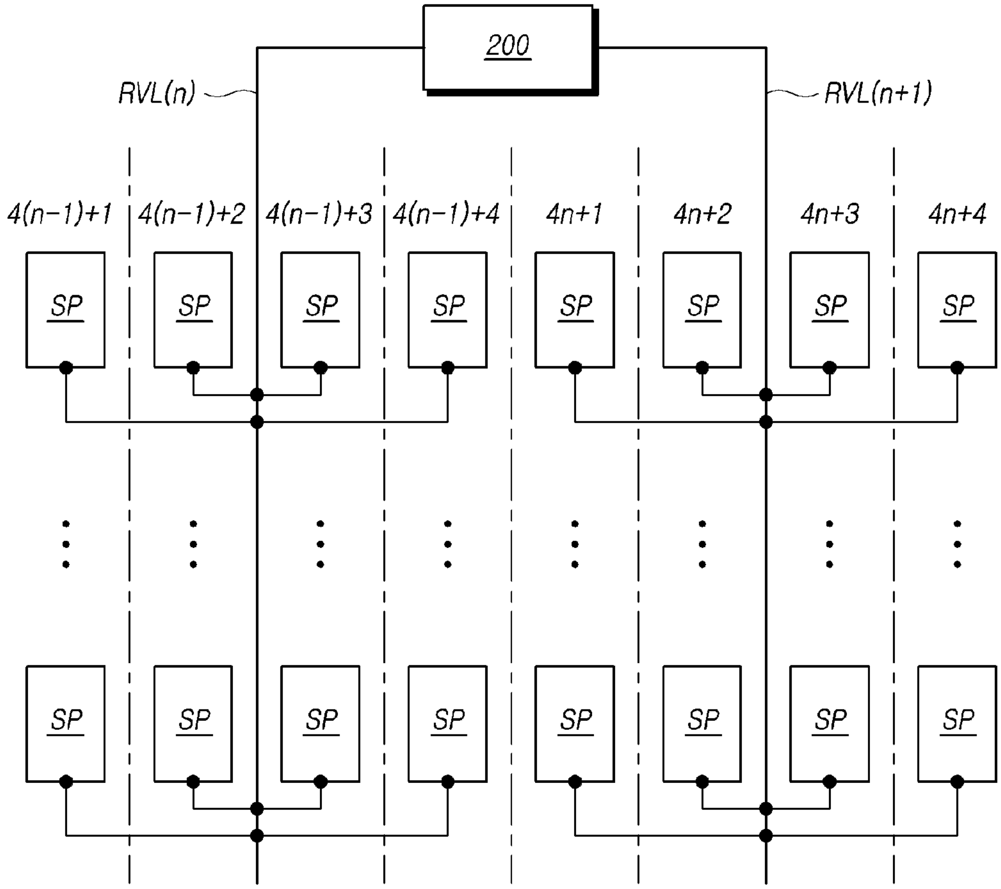
FIG. 4 illustrates an example of a connection structure of a reference voltage line for detecting a characteristic value of a subpixel included in a display device according to embodiments of the present disclosure.

FIG. 4 illustrates an example of a connection structure of a reference voltage line RVL for detecting a characteristic value of a subpixel SP included in a display device 100 according to embodiments of the present disclosure.

Referring to FIG. 4, as an example, a n-th reference voltage line RVL(n) may be electrically coupled to the subpixel SP disposed in a 4(n−1)+1st column, a 4(n−1)+2nd column, a 4(n−1)+3rd column, and a 4(n−1)+4th column.

Accordingly, by the n-th reference voltage line RVL(n), it may be detected a characteristic value of the subpixel SP disposed in the 4(n−1)+1st column, the 4(n−1)+2nd column, the 4(n−1)+3rd column and a 4(n−1)+4th column.

A (n+1)th reference voltage line RVL(n+1) may be electrically coupled to the subpixel SP disposed in a (4n+1)th column, a (4n+2)th column, a (4n+3)th column, and the (4n+4)th column.

Accordingly, by the (n+1)th reference voltage line (RVL (n+1)), it may be detected a characteristic value of the subpixel SP disposed in the (4n+1)th column, the (4n+2)th column, the (4n+3)th column, and the (4n+4)th column.

Since the characteristic values of the subpixels SP arranged in a plurality of columns are detected through the reference voltage line RVL, it is possible to detect the characteristic value of the subpixel SP while reducing the number of reference voltage lines RVL disposed on the display panel 110.

In addition, at least a portion of a block for driving the n-th reference voltage line (RVL(n)) in the sensing unit 200 and performing sensing may be shared with at least a portion of a block for driving the (n+1)th reference voltage line (RVL(n+1)) and performing sensing.

Since at least a portion of the block for driving the reference voltage line RVL is shared, it is possible to detect a characteristic value of the subpixel SP while reducing the size of a circuit used for sensing.

Figure 5:
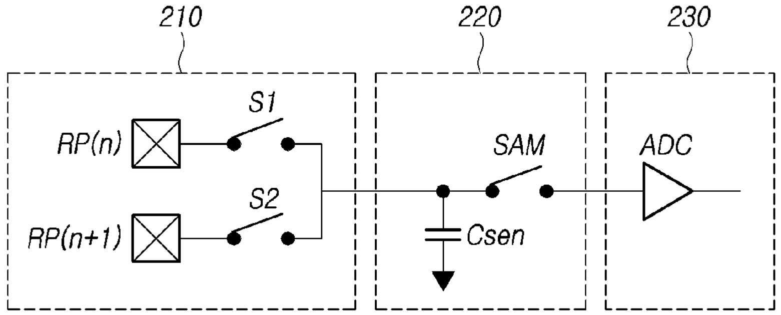
FIG. 5 illustrates an example of a structure of a sensing unit for detecting a characteristic value of a subpixel included in a display device according to embodiments of the present disclosure.

FIG. 5 illustrates an example of a structure of a sensing unit 200 for detecting a characteristic value of a subpixel SP included in a display device 100 according to embodiments of the present disclosure.

Referring to FIG. 5, the sensing unit 200 may include, for example, a channel block 210, a sampling block 220, and a conversion block 230.

The channel block 210 may include a plurality of sensing switches S1 and S2. The plurality of sensing switches S1 and S2 included in the channel block 210 may constitute one sensing group.

Each of the plurality of sensing switches S1 and S2 may be electrically coupled to the reference voltage line RVL through the reference voltage pads RP(n) and RP(n+1).

For example, a first sensing switch S1 may be electrically coupled to the n-th reference voltage line RVL(n) through a n-th reference voltage pad RP(n). A second sensing switch S2 may be electrically coupled to the (n+1)th reference voltage line RVL(n+1) through the (n+1)th reference voltage pad RP(n+1).

The sensing voltage Vsen through the n-th reference voltage line RVL(n) may be detected according to the driving of the first sensing switch S1. According to the driving of the second sensing switch S2, the sensing voltage Vsen through the (n+1)th reference voltage line RVL(n+1) may be detected.

The plurality of sensing switches S1 and S2 included in the channel block 210 may be electrically coupled to a circuit element included in the sampling block 220.

The sampling block 220 may include a sensing capacitor Csen electrically coupled to the plurality of sensing switches S1 and S2. The sampling block 220 may include a sampling switch SAM electrically coupled to the plurality of sensing switches S1 and S2 and the sensing capacitor Csen.

One sensing capacitor Csen and one sampling switch SAM included in the sampling block 220 may be electrically coupled to the plurality of sensing switches S1 and S2 included in the channel block 210 and constituting one sensing group.

The sensing capacitor Csen may be charged with the sensing voltage Vsen detected according to the driving of the plurality of sensing switches S1 and S2. Accordingly, the sensing capacitor Csen may be used for sensing through the n-th reference voltage line RVL(n) and sensing through the (n+1)th reference voltage line RVL(n+1).

According to the driving of the sampling switch SAM, the sensing voltage Vsen charged in the sensing capacitor Csen may be output to the conversion block 230.

The conversion block 230 may include, for example, an analog-to-digital converter ADC. The conversion block 230 may convert the sensing voltage Vsen received from the sampling block 220 into digital sensing data and output the converted sensing data.

The sensing data output by the conversion block 230 may be transmitted to the controller 140.

The controller 140 may set a compensation voltage capable of compensating for deterioration of the subpixel SP based on the sensing data.

The data driving circuit 130 may compensate for deterioration of the subpixel SP by supplying the compensation voltage set by the controller 140 to the subpixel SP.

As described above, since the sensing unit 200 detects the characteristic value of the subpixel SP and compensates for the deterioration of the subpixel SP, it is possible to prevent deterioration of image quality due to deterioration of the subpixel SP.

In addition, since the sensing capacitor Csen and the sampling switch SAM included in the sampling block 220 are electrically coupled to the plurality of sensing switches S1 and S2 included in one sensing group, it is possible to reduce circuit elements used for sensing.

Accordingly, it is possible to implement the sensing unit 200 reducing the size of the sensing unit 200 and detecting the characteristic value of the subpixel SP for compensating for deterioration of the subpixel SP.

The sensing unit 200 may detect the characteristic value of the subpixel SP by driving the plurality of sensing switches S1 and S2 included in one sensing group in various methods. By using these various methods, the length of the sensing period may be reduced or the accuracy of sensing may be improved.

Figure 6A:
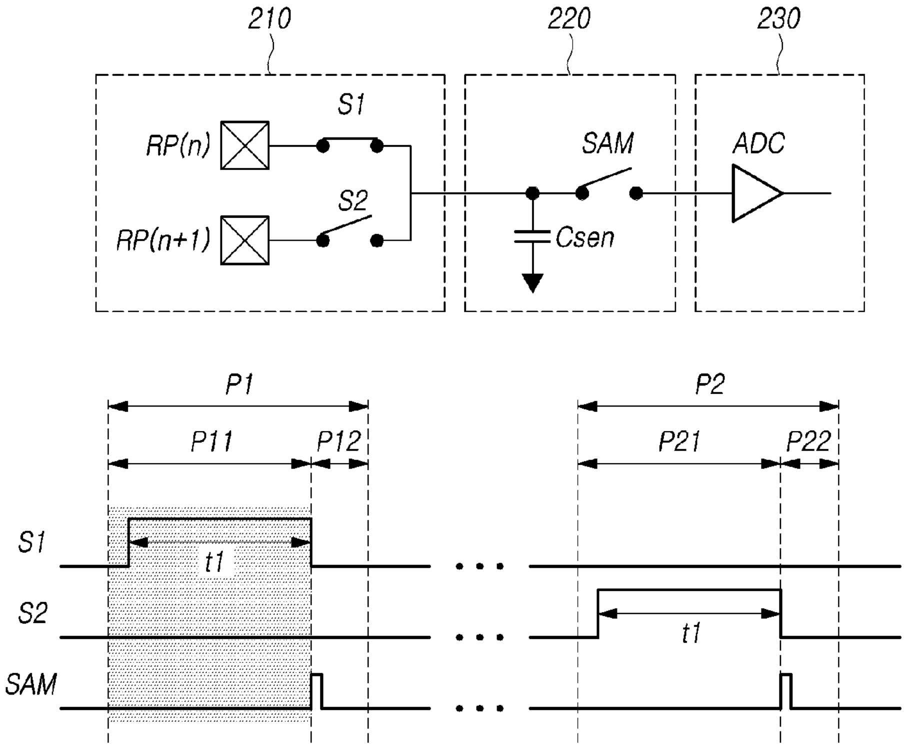
FIGS. 6A and 6B illustrate examples of a driving method of the sensing unit illustrated in FIG. 5.
Figure 6B:
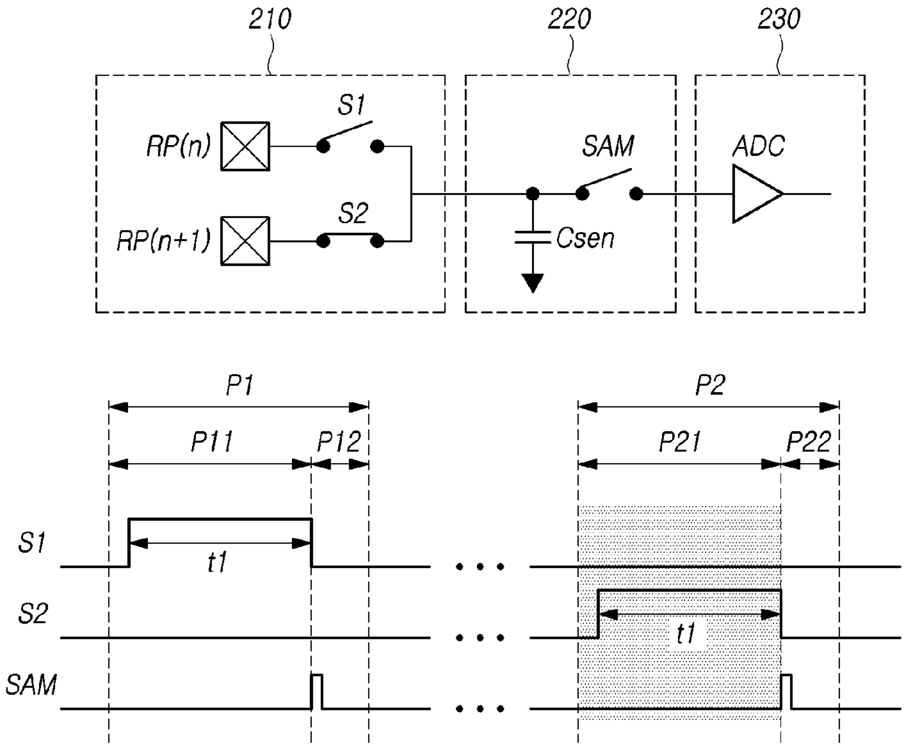

FIGS. 6A and 6B illustrate examples of a driving method of the sensing unit 200 illustrated in FIG. 5.

Referring to FIG. 6A, a plurality of sensing switches S1 and S2 included in a channel block 210 may be driven independently of each other.

As an example, the sensing by driving a first sensing switch S1 may be performed during a first sensing period P1.

The first sensing switch S1 may be in a turned-on state during at least a partial period of a first period P11 of the first sensing period P1. The second sensing switch S2 may be in a turned-off state in the first sensing period P1.

The length of the period in which the first sensing switch S1 is turned on in the first period P11 of the first sensing period P1 may be, for example, t1. In some cases, the first sensing switch S1 may remain in the turned-on state until a partial period of a second period P12 of the first sensing period P1.

The voltage level of the n-th reference voltage line RVL(n) may be in a saturated-state during a period in which the first sensing switch S1 is in the turned-on state. Charges may be charged in the sensing capacitor Csen according to the sensing voltage Vsen in the saturated-state of the n-th reference voltage line RVL(n).

The sampling switch SAM may be turned on in the second period P12 of the first sensing period P1. The sampling switch SAM may be turned on immediately after the first sensing switch S1 is turned off. Alternatively, the sampling switch SAM may be in the turned-on state before the first sensing switch S1 is turned off during a period in which the first sensing switch S1 remains in the turned-on state.

Since the sampling switch SAM is turned on, the sensing voltage Vsen charged in the sensing capacitor Csen may be output to the conversion block 230.

A compensation voltage according to sensing performed in the first sensing period P1 may be supplied to the subpixel SP in a display driving period after the first sensing period P1.

The compensation voltage may be supplied to the subpixel SP electrically coupled to the n-th reference voltage line RVL(n).

In addition, the compensation voltage may be supplied to the subpixel SP to be electrically coupled to the (n+1)th reference voltage line RVL(n+1).

After the first sensing period P1, the same compensation voltage may be supplied to the subpixel SP driven by the reference voltage line RVL electrically coupled to each of the plurality of sensing switches S1 and S2 included in one sensing group.

Since the compensation for the subpixel SP driven by the n-th reference voltage line RVL(n) and the subpixel SP driven by the (n+1)th reference voltage line RVL(n+1) is performed according to the sensing result performed in the first sensing period P1, it is possible to compensate the deterioration of the subpixel SP while reducing the sensing period.

The sensing using the second sensing switch S2 may be performed in a second sensing period P2 after the first sensing period P1.

Referring to FIG. 6B, the second sensing switch S2 may be turned on during at least a partial period of a first period P21 of the second sensing period P2. The first sensing switch S1 may be turned off during the second sensing period P2.

The length of the period in which the second sensing switch S2 is turned on in the first period P21 of the second sensing period P2 may be, for example, t1. The length of the period in which the second sensing switch S2 is turned on in the second sensing period P1 may be equal to the length of the period in which the first sensing switch S1 is turned on in the first sensing period P1. In some cases, the second sensing switch S2 may remain in the turned-on state until a partial period of a second period P22 of the second sensing period P2.

The voltage level of the (n+1)th reference voltage line RVL(n+1) may be in a saturated-state during a period in which the second sensing switch S2 is turned on. The sensing capacitor Csen may be charged according to the sensing voltage Vsen in the saturated-state of the (n+1)th reference voltage line RVL(n+1).

The sampling switch SAM may be turned on in the second period P22 of the second sensing period P2. The sampling switch SAM may be turned on immediately after the second sensing switch S2 is turned off or before the second sensing switch S2 is turned off.

The sensing voltage Vsen charged in the sensing capacitor Csen may be output to the conversion block 230.

In the second sensing period P2, a compensation voltage according to a sensing result performed through the (n+1)th reference voltage line RVL(n+1) may be supplied to the subpixel SP.

The compensation voltage may be supplied to the subpixel SP electrically coupled to the (n+1)th reference voltage line RVL(n+1).

The compensation voltage obtained in the first sensing period P1 may be supplied to the subpixel SP electrically coupled to the n-th reference voltage line RVL(n).

Accordingly, after the second sensing period P2, the compensation voltage supplied to the subpixel SP electrically coupled to the n-th reference voltage line RVL(n) may be different from the compensation voltage supplied to the subpixel SP electrically coupled to the (n+1)th reference voltage line RVL(n+1).

Since the sensing is performed by alternating a plurality of sensing switches S1 and S2 included in one sensing group, the overall sensing period can be reduced.

Further, in some cases, by supplying the same compensation voltage to the subpixels SP electrically coupled to the plurality of reference voltage lines RVL corresponding to one sensing group, it is possible to perform overall compensation using the sensing performed by driving some of the plurality of sensing switches S1 and S2 included in one sensing group.

In addition, according to embodiments of the present disclosure, since the sensing is performed while substantially simultaneously or concurrently turning on the plurality of sensing switches S1 and S2 included in one sensing group, it is possible to reduce the sensing period and improve the sensing accuracy. The use of the term substantially simultaneously herein includes events that happen at exactly the same time, at about the same time or near the same time. As can be appreciated, in electrical circuits there are propagation delays for signals travelling through circuits. In addition, when an action is started at one node is a circuit and causes actions in other nodes, there will be timing delays and difference for when respective circuits change state and for when signals arrive at and leave circuits. Thus, all of these differences in timing are taken into account and fall within the meaning of substantially simultaneously as used herein. The term concurrently is broader, including events that overlap in time, but do not need to start and/or end at the same time or last for the same amount of time.

Figure 7:
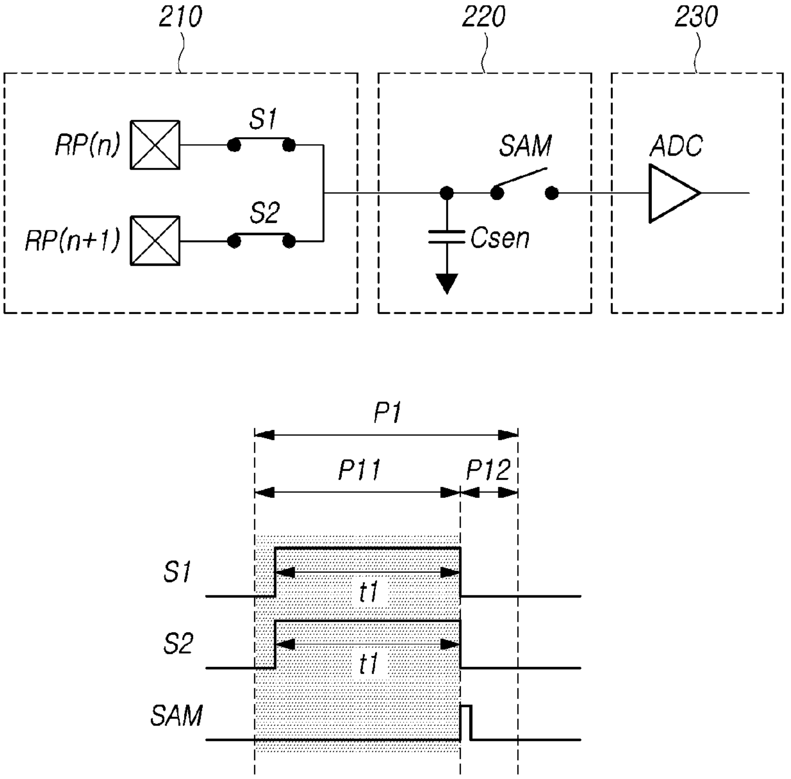
FIG. 7 illustrates another example of a driving method of the sensing unit illustrated in FIG. 5.

FIG. 7 illustrates another example of a driving method of the sensing unit 200 illustrated in FIG. 5.

Referring to FIG. 7, a plurality of sensing switches S1 and S2 included in the channel block 210 and constituting one sensing group may be driven in the same manner.

For example, in a first period P11 of a first sensing period P1, a first sensing switch S1 and a second sensing switch S2 may be turned on.

The first sensing switch S1 and the second sensing switch S2 may be turned on for the same period. For example, the length of the period in which the first sensing switch S1 and the second sensing switch S2 are turned on may be t1. In some cases, the first sensing switch S1 and the second sensing switch S2 may remain in a turned-on state until a partial period of a second period P12 of the first sensing period P1.

Since the first sensing switch S1 and the second sensing switch S2 are simultaneously turned on, the n-th reference voltage line RVL(n) and the (n+1)th reference voltage line RVL(n+1) may be in a state to be electrically coupled to each other.

The n-th reference voltage line RVL(n) and the (n+1)th reference voltage line RVL(n+1) may be equally in a saturated-state. The sensing voltage Vsen of the n-th reference voltage line RVL(n) and the (n+1)th reference voltage line RVL(n+1), which are saturated, may be charged in the sensing capacitor Csen.

The sensing voltage Vsen charged in the sensing capacitor Csen may be, for example, an average value of the characteristic value of the subpixel SP electrically coupled to the n-th reference voltage line RVL(n) and the characteristic value of the subpixel SP electrically coupled to the (n+1)th reference voltage line RVL(n+1).

Alternatively, the sensing voltage Vsen charged in the sensing capacitor Csen may be a value close to the average value.

The sampling switch SAM may be turned on in the second period P12 of the first sensing period P1. The sampling switch SAM may be turned on immediately after the first sensing switch S1 and the second sensing switch S2 are turned off or before the first sensing switch S1 and the second sensing switch S2 are turned off.

The sensing voltage Vsen obtained through the n-th reference voltage line RVL(n) and the (n+1)th reference voltage line RVL(n+1) may be transmitted to the controller 140 through the conversion block 230.

The controller 140 may set a compensation voltage according to the sensing result performed using the n-th reference voltage line RVL(n) and the (n+1)th reference voltage line RVL(n+1) at the same time.

The set compensation voltage may be supplied to a subpixel SP electrically coupled to the n-th reference voltage line RVL(n) and a subpixel SP electrically coupled to the (n+1)th reference voltage line RVL(n+1).

Accordingly, since there may be compensated the deterioration of the subpixels SP electrically coupled to the plurality of reference voltage lines RVL using the sensing performed by simultaneously or concurrently driving the plurality of sensing switches S1 and S2, it is possible to compensate the deterioration of the subpixel SP while reducing the sensing period.

In addition, since the compensation value is set based on an average value or a value close to the average value of deterioration of the subpixels SP electrically coupled to the plurality of reference voltage lines RVL, it is possible to improve the accuracy of compensation while reducing the sensing period.

In addition, according to embodiments of the present disclosure, some of the sensing switches S1 and S2 are driven to perform sensing after sensing is performed by simultaneously or concurrently with some overlap in timing for driving a plurality of sensing switches S1 and S2, it is possible to further improve the sensing accuracy.

Figure 8A:
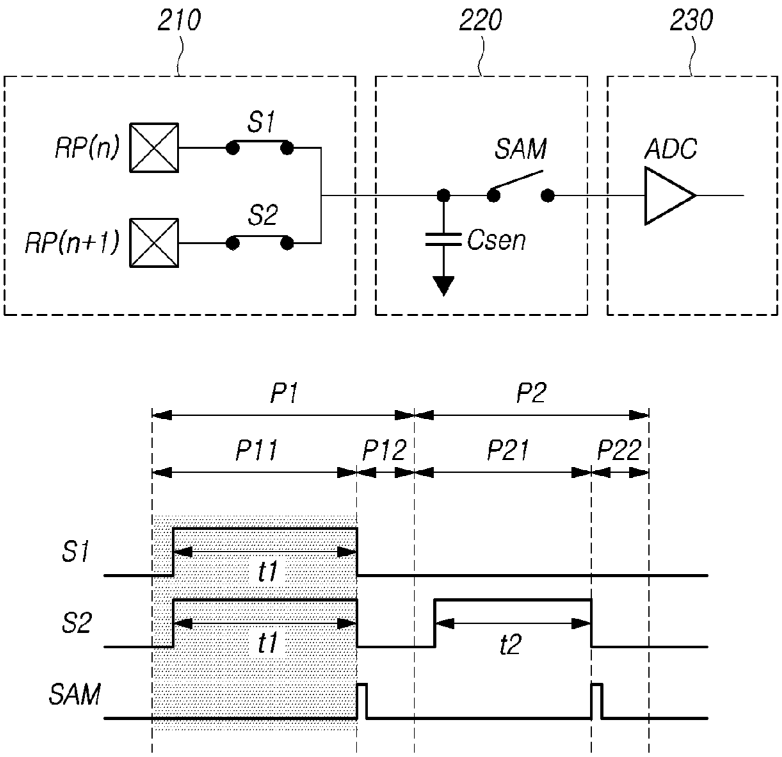
FIGS. 8A and 8B illustrate another example of a driving method of the sensing unit illustrated in FIG. 5.
Figure 8B:
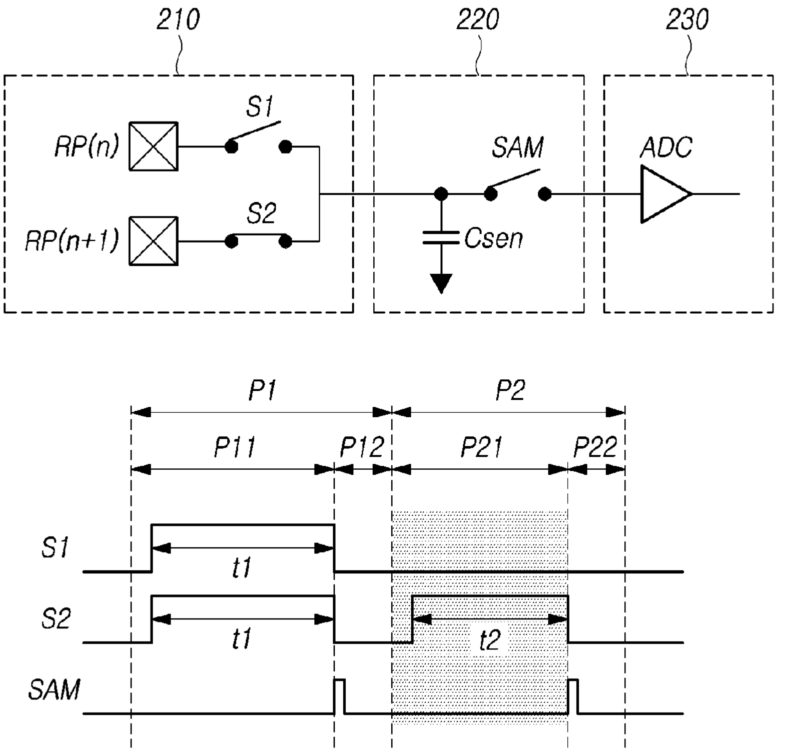
Figure 9A:
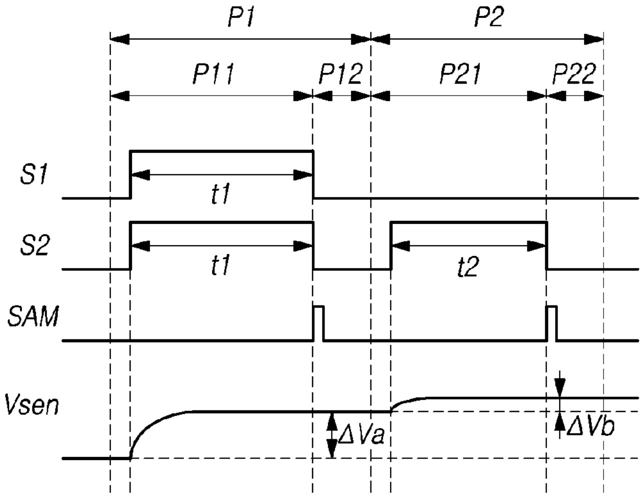
FIGS. 9A and 9B illustrate examples of a sensing voltage during sensing according to the driving method illustrated in FIGS. 8A and 8B.
Figure 9B:
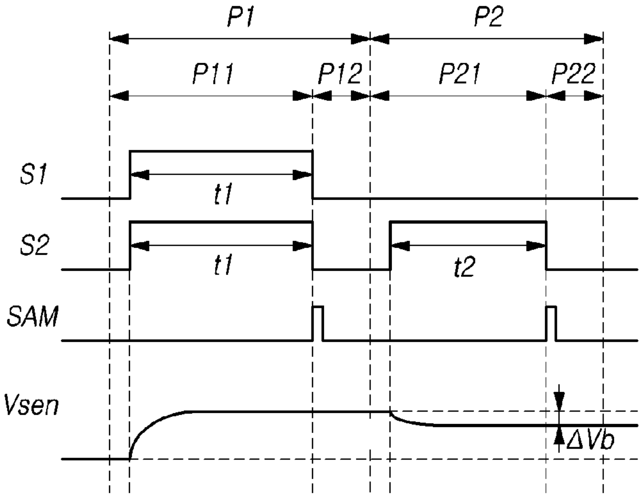

FIGS. 8A and 8B illustrate another example of a driving method of the sensing unit 200 illustrated in FIG. 5. FIGS. 9A and 9B illustrate examples of a sensing voltage Vsen during sensing according to the driving method illustrated in FIGS. 8A and 8B.

Referring to FIG. 8A, the sensing unit 200 may perform primary sensing by driving a plurality of sensing switches S1 and S2 included in one sensing group, and may perform secondary sensing after terminating primary sensing.

For example, a plurality of sensing switches S1 and S2 may be simultaneously or concurrently driven in a first sensing period P1 in which the primary sensing is performed.

The first sensing switch S1 and the second sensing switch S2 may be simultaneously or substantially simultaneously turned on during a first period P11 of the first sensing period P1. The length of the period in which the first sensing switch S1 and the second sensing switch S2 are turned on may be, for example, t1. In some cases, the first sensing switch S1 and the second sensing switch S2 may remain in a turned-on state until a partial period of a second period P12 of the first sensing period P1.

The sampling switch SAM may be turned on in the second period P12 of the first sensing period P1. The sampling switch SAM may be turned on immediately after the first sensing switch S1 and the second sensing switch S2 are turned off or before the first sensing switch S1 and the second sensing switch S2 are turned off.

There may be acquired an average value or a value close to the average value of the characteristic value of the subpixel SP electrically coupled to the nth reference voltage line RVL(n) and the characteristic value of the subpixel SP electrically coupled to the (n+1)th reference voltage line RVL(n+1) through sensing performed by simultaneously, substantially simultaneously or concurrently driving the first sensing switch S1 and the second sensing switch S2 in the first sensing period P1.

The sensing unit 200 may perform secondary sensing after terminating primary sensing. During a period for the secondary sensing, fewer than all of the plurality of sensing switches S1 and S2 may be driven, for example, one of the sensing switches may be driven.

Referring to FIG. 8B, as an example, in a second sensing period P2 in which the secondary sensing is performed, the second sensing switch S2 among the plurality of sensing switches S1 and S2 may be turned on. The first sensing switch S1 may be turned off during the second sensing period P2.

Alternatively, the second sensing switch S2 may remain in a turned-on state in the first sensing period P1 until the second sensing period P2 for secondary sensing.

For example, in the first sensing period P1, the first sensing switch S1 and the second sensing switch S2 may be turned on. The first sensing switch S1 may be turned off before the first sensing period P1 ends.

The second sensing switch S2 may not be turned off during the first sensing period P1. The second sensing switch S2 may remain in a turned-on state until the second sensing period P2 for secondary sensing.

The second sensing switch S2 may be turned on during at least a part of a first period P21 of the second sensing period P2. The length of the period in which the second sensing switch S2 is turned on may be, for example, t2. Further, t2 may be shorter than t1. In some cases, the second sensing switch S2 may remain in the turned-on state until a partial period of a second period P22 of the second sensing period P2.

The n-th reference voltage line RVL(n) and the (n+1)th reference voltage line RVL(n+1) may be in a saturated state by sensing performed in the first sensing period P1.

Since only the second sensing switch S2 is turned on in the second sensing period P2, only the voltage level of the (n+1)th reference voltage line RVL(n+1) may be changed. Since the voltage level of the (n+1)th reference voltage line RVL(n+1) is changed in the saturated state in the first sensing period P1, the time spent for the (n+1)th reference voltage line RVL(n+1) to be newly saturated may be shortened.

In the second sensing period P2, the length t2 of the period in which the second sensing switch S2 is turned on is shorter than the length t1 of a period in which the first sensing switch S1 and the second sensing switch S2 are turned on in the first sensing period P1, so that there may be performed the sensing using the (n+1)th reference voltage line RVL(n+1).

Since the length of the period in which the second sensing switch S2 is turned on in the second sensing period P2 is shortened, the length of the first period P21 of the second sensing period P2 may be shorter than the length of the first period P11 of the first sensing period P1.

The characteristic value of the subpixel SP electrically coupled to the (n+1)th reference voltage line RVL(n+1) may be detected from the sensing result obtained in the second sensing period P2. Since it is acquired the average value or a value close to the average value of the characteristic value of the subpixel SP electrically coupled to the nth reference voltage line RVL(n) and the characteristic value of the subpixel SP electrically coupled to the (n+1)th reference voltage line RVL(n+1) by sensing performed in the first sensing period P1, it is possible to detect the characteristic value of the subpixel SP electrically coupled to the nth reference voltage line RVL(n) by using the sensing result obtained in the first sensing period P1 and the sensing result obtained in the second sensing period P2.

Therefore, the sensing period may be reduced compared to the method of separately performing sensing using the n-th reference voltage line RVL(n) and sensing using the (n+1)th reference voltage line RVL(n+1), and it may provide an equivalent level of sensing accuracy.

According to the characteristic value of the subpixel SP electrically coupled to the reference voltage line RVL sensed in the second sensing period P2, the sensing voltage Vsen detected in the second sensing period P2 may be greater or smaller than the sensing voltage Vsen detected in the first sensing period P1.

Referring to FIGS. 9A and 9B, in the first sensing period P1, for the sensing in which the first sensing switch S1 and the second sensing switch S2 are turned on at the same time, the amount of change in the sensing voltage Vsen may be ΔVa.

In the second sensing period P2, the first sensing switch S1 is in a turned-off state, and only the second sensing switch S2 is in a turned-on state, and the amount of change in the sensing voltage Vsen during sensing may be ΔVb.

Since, in a state in which the n-th reference voltage line RVL(n) and the (n+1)th reference voltage line RVL(n+1) are saturated in the first sensing period P1, only the (n+1)th reference voltage line RVL(n+1) changes to the saturated state in the second sensing period P2, ΔVb may be less than ΔVa.

Since the time for the reference voltage line RVL to reach the saturated state is short, the length of the second sensing period P2 may be shorter than the length of the first sensing period P1. Accordingly, it is possible to reduce the overall sensing period and improve sensing accuracy.

The sensing voltage Vsen obtained in the first sensing period P1 may correspond to an average value or a value close to the average value of the characteristic value of the subpixel SP electrically coupled to the nth reference voltage line RVL(n) and the characteristic value of the subpixel SP electrically coupled to the (n+1)th reference voltage line RVL(n+1).

The sensing voltage Vsen obtained in the second sensing period P2 may correspond to the characteristic value of the subpixel SP electrically coupled to the (n+1)th reference voltage line RVL(n+1).

Accordingly, according to the difference between the degree of deterioration of the subpixel SP electrically coupled to the (n+1)th reference voltage line RVL(n+1) and the degree of deterioration of the subpixel electrically coupled to the n-th reference voltage line RVL(n), the sensing voltage Vsen appearing in the second sensing period P2 may be changed.

As an example, as illustrated in FIG. 9A, the sensing voltage Vsen appearing in the second sensing period P2 may be greater than the sensing voltage Vsen appearing in the first sensing period P1.

Alternatively, as illustrated in FIG. 9B, the sensing voltage Vsen appearing in the second sensing period P2 may be smaller than the sensing voltage Vsen appearing in the first sensing period P1.

It is possible to accurately detect the characteristic value of the subpixel SP electrically coupled to the (n+1)th reference voltage line RVL(n+1) using the sensing voltage Vsen obtained in the second sensing period P2.

In addition, by using the sensing voltage Vsen obtained in the first sensing period P1 and the sensing voltage Vsen obtained in the second sensing period P2, it is possible to accurately detect the characteristic value of the subpixel SP electrically coupled to the n-th reference voltage line RVL (n).

Accordingly, by reducing the overall sensing period and by accurately detecting the characteristic value of the subpixel SP through the reference voltage line RVL driven by a plurality of sensing switches S1 and S2 included in one sensing group, it is possible to improve the performance of compensation for the deterioration of the subpixel SP.

In addition, according to the embodiments of the present disclosure, the size of the sensing unit 200 can be further reduced by increasing the number of sensing switches included in one sensing group, and it is possible to detect the characteristic value of the subpixel SP and compensate the deterioration of the subpixel SP.

Figure 10A:
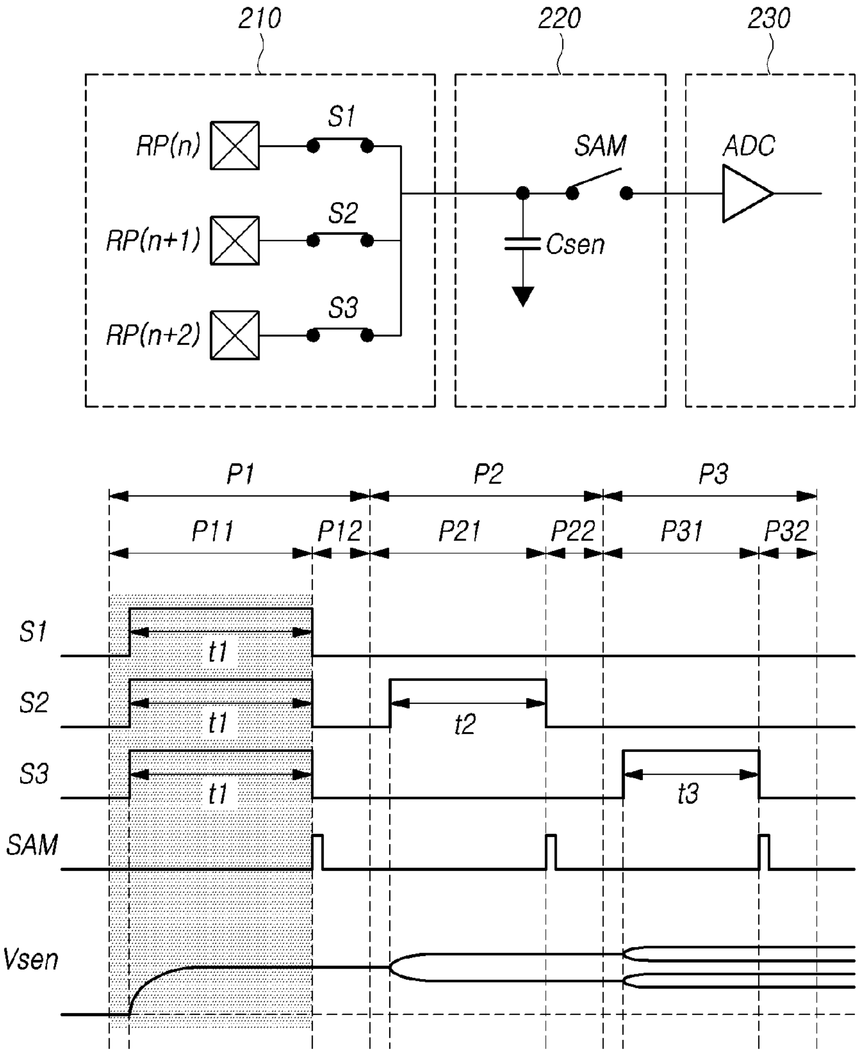
FIGS. 10A to 10C illustrate another example of a structure and a driving method of a sensing unit for detecting a characteristic value of a subpixel included in a display device according to embodiments of the present disclosure.
Figure 10B:
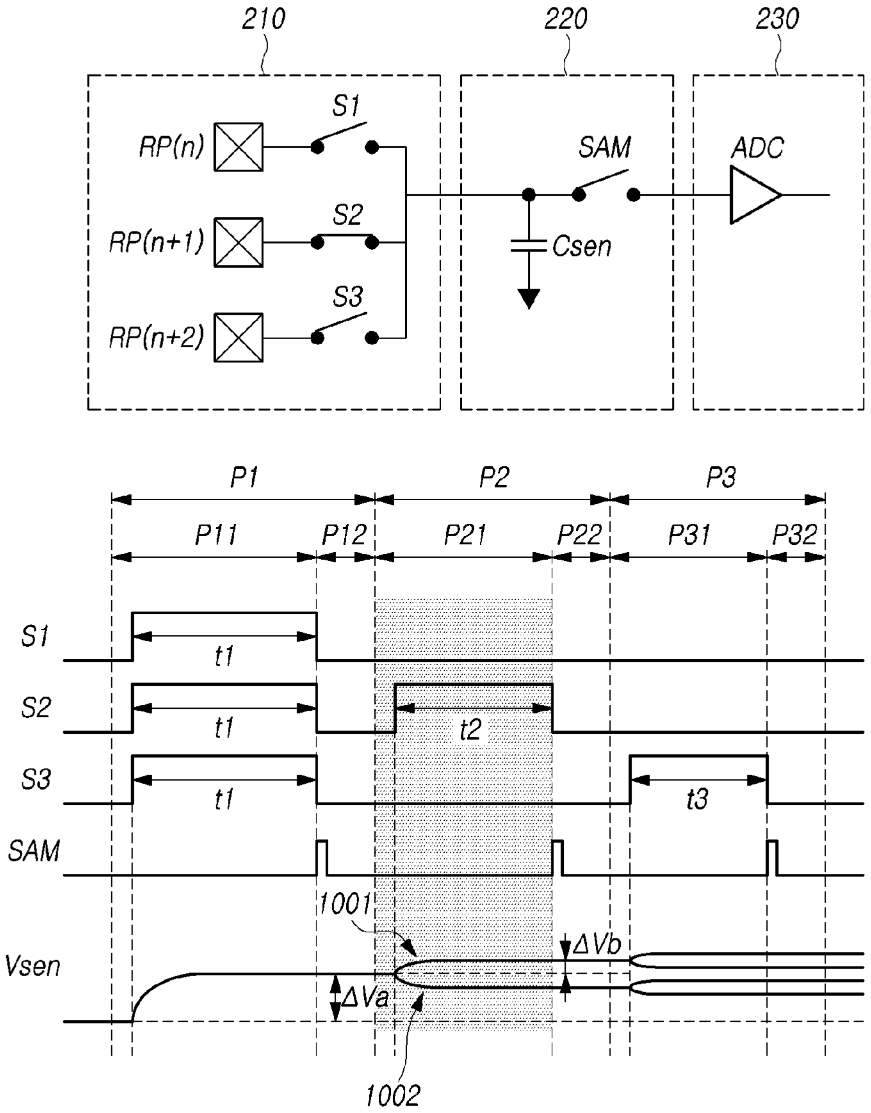
Figure 10C:
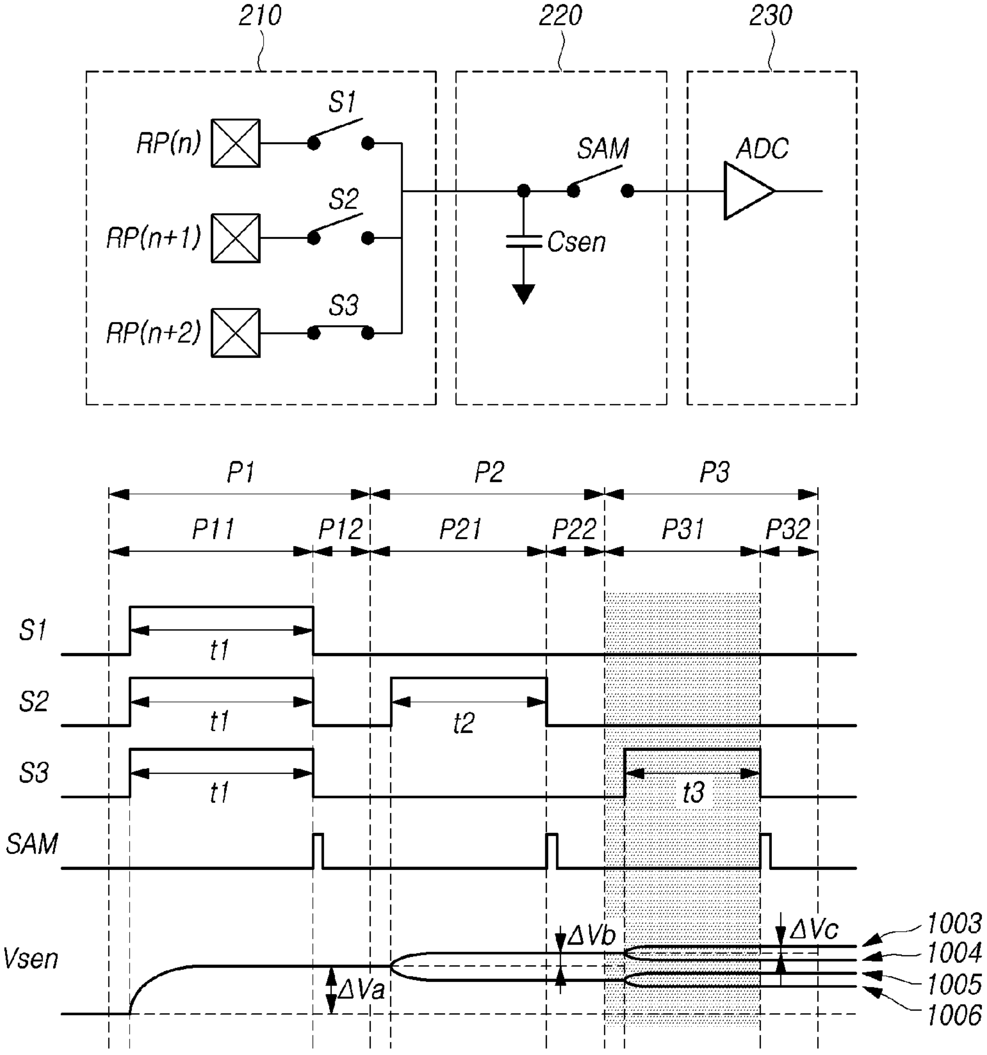

FIGS. 10A to 10C illustrate another example of a structure and a driving method of a sensing unit 200 for detecting a characteristic value of a subpixel SP included in a display device 100 according to embodiments of the present disclosure.

Referring to FIG. 10A, a channel block 210 included in the sensing unit 200 may include a plurality of sensing switches S1, S2 and S3.

A first sensing switch S1 may be electrically coupled to the n-th reference voltage line RVL(n) through the n-th reference voltage pad RP(n). A second sensing switch S2 may be electrically coupled to the (n+1)th reference voltage line RVL(n+1) through the (n+1)th reference voltage pad RP(n+1). A third sensing switch S3 may be electrically coupled to the (n+2)th reference voltage line RVL(n+2) through the (n+2)th reference voltage pad RP(n+2).

The first sensing switch S1, the second sensing switch S2, and the third sensing switch S3 may be electrically coupled to a sensing capacitor Csen and a sampling switch SAM included in the sampling block 220.

Since the first sensing switch S1, the second sensing switch S2, and the third sensing switch S3 are electrically coupled to one sensing capacitor Csen, the size of the sensing unit 200 can be reduced.

The first sensing switch S1, the second sensing switch S2, and the third sensing switch S3 may be driven independently or may be driven simultaneously or concurrently. Further, a simultaneous driving and a partial driving may be sequentially performed.

For example, the first sensing switch S1, the second sensing switch S2, and the third sensing switch S3 may be independently driven, and the sensing of the characteristic value and the compensation of the deterioration of the subpixel SP may be separately performed.

In this case, the compensation value obtained by driving any one sensing switch may be used to compensate for deterioration of the subpixel SP electrically coupled to the reference voltage line RVL corresponding to the other sensing switch.

As another example, the first sensing switch S1, the second sensing switch S2, and the third sensing switch S3 may be simultaneously driven.

In this case, the degradation compensation of the subpixel SP may be performed based on an average value or a value close to the average value of the characteristic values of the subpixels SP electrically coupled to the reference voltage line RVL corresponding to the first sensing switch S1, the second sensing switch S2 and the third sensing switch S3.

As another example, the first sensing switch S1, the second sensing switch S2 and the third sensing switch S3 may be simultaneously or substantially simultaneously driven to perform the primary sensing, and some of the first sensing switch S1, the second sensing switch S2 and the third sensing switch S3 may be driven to perform the secondary sensing.

Further, a third sensing may be performed after secondary sensing, and a sensing switch driven during secondary sensing may be different from a sensing switch driven during the third sensing.

Referring to FIG. 10A, in the first sensing period P1, the first sensing switch S1, the second sensing switch S2, and the third sensing switch S3 may be simultaneously or substantially simultaneously turned on.

The length of the period in which the first sensing switch S1, the second sensing switch S2 and the third sensing switch S3 are turned on may be, for example, t1. In some cases, the first sensing switch S1, the second sensing switch S2 and the third sensing switch S3 may remain in a turned-on state until a partial period of a second period P12 of the first sensing period P1.

During a period in which the first sensing switch S1, the second sensing switch S2 and the third sensing switch S3 are turned on in the first sensing period P1, the n-th reference voltage line RVL(n), the (n+1)th reference voltage line RVL(n+1) and the (n+2)th reference voltage line RVL(n+2) may be electrically coupled.

In the first sensing period P1, there may be acquired an average value or a value close to the average value of the characteristic value of the subpixel SP electrically coupled to the n-th reference voltage line RVL(n), the characteristic value of the subpixel SP electrically coupled to the (n+1)th reference voltage line RVL(n+1), and the characteristic value of the subpixel SP electrically coupled to the (n+2)th reference voltage line RVL(n+2).

After the first sensing period P1, in the second sensing period P2 and the third sensing period P3, a part of the first sensing switch S1, the second sensing switch S2 and the third sensing switch S3 may be driven to perform sensing.

Referring to FIG. 10B, for example, in the second sensing period P2, the first sensing switch S1 and the third sensing switch S3 may be turned off. In the second sensing period P2, the second sensing switch S2 may be in a turned-on state. Alternatively, the second sensing switch S2 may be turned on in the first sensing period P1 and remain in the turned-on state until the second sensing period P2.

The length of the period in which the second sensing switch S2 is turned on in the second sensing period P2 may be, for example, t2. t2 may be shorter than t1. In some cases, the second sensing switch S2 may remain in the turned-on state until a partial period of a second period P22 of the second sensing period P2.

In the second sensing period P2, the (n+1)th reference voltage line RVL(n+1) electrically coupled to the second sensing switch S2 may be in a saturated state. In addition, the sensing voltage Vsen may be obtained to correspond to the characteristic value of the subpixel SP electrically coupled to the (n+1)th reference voltage line RVL(n+1).

In the state in which the n-th reference voltage line RVL(n), the (n+1)th reference voltage line RVL(n+1) and the (n+2)th reference voltage line RVL(n+2) are in the saturated state in the first sensing period P1, the (n+1)th reference voltage line RVL(n+1) may become in the saturated state in the second sensing period P2.

Accordingly, the amount of change ΔVb of the sensing voltage Vsen in the second sensing period P2 may be less than the amount of change ΔVa of the sensing voltage Vsen in the first sensing period P1. In addition, the second sensing period P2 may be shorter than the first sensing period P1.

According to the characteristic value of the subpixel SP electrically coupled to the (n+1)th reference voltage line RVL(n+1) in the second sensing period P2, the sensing voltage Vsen may increase as in the example indicated by 1001 or may decrease as in the example indicated by 1002.

In the second sensing period P2, sensing is performed for a shorter time than the first sensing period P1, and it is possible to detect an accurate characteristic value of the subpixel SP electrically coupled to the (n+1)th reference voltage line RVL(n+1).

Referring to FIG. 10C, in a third sensing period P3, some of the first sensing switch S1, the second sensing switch S2 and the third sensing switch S3 are driven to perform sensing. The sensing switch driven in the third sensing period P3 may be different from the sensing switch driven in the second sensing period P2.

For example, in the third sensing period P3, the first sensing switch S1 and the second sensing switch S2 may be in a turned-off state.

The third sensing switch S3 may be turned on in the third sensing period P3. Alternatively, in some cases, the third sensing switch S3 may be turned on in the first sensing period P1 and may remain in the turned-on state until the third sensing period P3. In this case, sensing may be performed while the second sensing switch S2 and the third sensing switch S3 are turned on in the second sensing period P2 described above.

The length of a period in which the third sensing switch S3 is turned on in a first period P31 of the third sensing period P3 may be, for example, t3. In some cases, the third sensing switch S3 may remain in the turned-on state until a partial period of a second period P32 of the third sensing period P3.

The length t3 may be shorter than the length t1 of the period in which the first sensing switch S1, the second sensing switch S2 and the third sensing switch S3 are simultaneously or substantially simultaneously turned on in the first sensing period P1. In addition, the length t3 may be shorter than a length t2 of a period in which the second sensing switch S2 is turned on in the second sensing period P2.

Since sensing is performed in the third sensing period P3 after sensing in the first sensing period P1 and the second sensing period P2, an amount of change ΔVc of the sensing voltage Vsen in the third sensing period P3 may be less than an amount of change ΔVa of the sensing voltage Vsen in the first sensing period P1.

In addition, an amount of change ΔVc of the sensing voltage Vsen in the third sensing period P3 may be less than an amount of change ΔVb of the sensing voltage Vsen in the second sensing period P2.

In the third sensing period P3, there may be detected the characteristic value of the subpixel SP electrically coupled to the (n+2)th reference voltage line RVL(n+2) driven by the third sensing switch S3.

According to the characteristic value of the subpixel SP electrically coupled to the (n+2)th reference voltage line RVL(n+2), the sensing voltage Vsen detected in the third sensing period P3 may be greater than the sensing voltage Vsen of the second sensing period P2 as in the example indicated by 1003 or 1005. Alternatively, as in the example indicated by 1004 or 1006, the sensing voltage Vsen detected in the third sensing period P3 may be less than the sensing voltage Vsen of the second sensing period P2.

Through the third sensing period P3 which is shorter than the first sensing period P1 and the second sensing period P2, there may be detected the accurate characteristic value of the subpixel SP electrically coupled to the (n+2)th reference voltage line RVL(n+2).

In addition, based on the sensing result obtained in the first sensing period P1, the sensing result obtained in the second sensing period P2, and the sensing result obtained in the third sensing period P3, there may be accurately detected the characteristic value of the subpixel SP electrically coupled to the n-th reference voltage line RVL(n), the characteristic value of the subpixel SP electrically coupled to the (n+1)th reference voltage line RVL(n+1), and the characteristic value of the subpixel SP electrically coupled to the (n+2)th reference voltage line RVL(n+2).

Accordingly, it is possible to reduce the sensing period performed while driving the plurality of reference voltage lines RVL, and to accurately detect the characteristic value of the subpixel SP electrically coupled to the reference voltage line RVL and compensate the deterioration of the subpixel SP.

According to the above-described embodiments of the present disclosure, two or more sensing switches included in the sensing unit 200 for sensing the characteristic value of the subpixel SP and electrically coupled to the reference voltage line RVL share the sensing capacitor Csen, so that it is possible to detect the deterioration of the subpixel SP while reducing the size of the sensing unit 200.

In addition, by simultaneously or substantially simultaneously driving two or more sensing switches sharing the sensing capacitor Csen to perform sensing, the sensing period may be reduced and deterioration compensation of the subpixel SP may be performed.

In addition, after performing primary sensing by simultaneously or substantially simultaneously driving two or more sensing switches sharing the sensing capacitor Csen, by continuously driving some sensing switches to perform secondary sensing shorter than primary sensing, it is possible to improve the sensing accuracy while reducing the overall sensing period.

The above description has been presented to enable any person skilled in the art to make and use the technical idea of the present disclosure, and has been provided in the context of a particular application. Various modifications, additions and substitutions to the described embodiments will be readily apparent to those skilled in the art, and the general principles described herein may be applied to other embodiments and applications without departing from the spirit and scope of the present disclosure. The above description and the accompanying drawings provide an example of the technical idea of the present disclosure for illustrative purposes. That is, the disclosed embodiments are intended to illustrate the scope of the technical idea of the present disclosure.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A display device comprising:

a plurality of subpixels disposed on a display panel;

a plurality of reference voltage lines electrically coupled to some of the plurality of subpixels; and a data driving circuit configured to drive the plurality of reference voltage lines, wherein the data driving circuit includes:

a first sensing switch electrically coupled to a first reference voltage line among the plurality of reference voltage lines, and a second sensing switch electrically coupled to a second reference voltage line among the plurality of reference voltage lines;

a sensing capacitor electrically coupled to the first sensing switch and the second sensing switch; and a sampling switch electrically coupled to the sensing capacitor, wherein the data driving circuit is configured to detect a characteristic value of a first subpixel of the plurality of subpixels by the first reference voltage line when the first sensing switch is turned on in a first sensing period, and to detect the characteristic value of a second subpixel of the plurality of subpixels by the second reference voltage line when the second sensing switch is turned on in a second sensing period, wherein, a compensation voltage is supplied to the first subpixel electrically coupled to the first reference voltage line and to the second subpixel electrically coupled to the second reference voltage line during a display driving period between the first sensing period and the second sensing period, the compensation voltage being determined based on the characteristic value of the first subpixel detected through the first reference voltage line, wherein each of the plurality of subpixels comprises a light emitting device and a driving transistor for driving the light emitting device, and wherein the characteristic value of the first subpixel or the second subpixel includes at least one of mobility of the driving transistor, a threshold voltage of the driving transistor, or a threshold voltage of the light emitting device, wherein, in a display driving period after the second sensing period, a first compensation voltage is supplied to subpixels electrically coupled to the first reference voltage line, and a second compensation voltage is supplied to subpixels electrically coupled to the second reference voltage line, and wherein the first compensation voltage is determined based on the characteristic value of the first subpixel detected through the first reference voltage line in the first sensing period, and the second compensation voltage is determined based on the characteristic value of the second subpixel detected through the second reference voltage line in the second sensing period.

2. The display device of claim 1, wherein the first compensation voltage and the second compensation voltage are different from each other.

3. The display device of claim 1, wherein the first sensing switch is turned on in at least a partial period of a first period of the first sensing period, and the sampling switch is turned on in a second period of the first sensing period.

4. The display device of claim 3, wherein the sampling switch is turned off in the first period of the first sensing period.

5. The display device of claim 3, wherein the second sensing switch is turned off in the first sensing period.

6. The display device of claim 1, wherein the second sensing switch is turned on in at least a partial period of a first period of the second sensing period, and the sampling switch is turned on in a second period of the second sensing period.

7. The display device of claim 6, wherein the sampling switch is turned off in the first period of the second sensing period.

8. The display device of claim 6, wherein the first sensing switch is turned off in the second sensing period.

9. The display device of claim 1, wherein a length of a period in which the second sensing switch is turned on in the second sensing period is equal to a length of a period in which the first sensing switch is turned on in the first sensing period.

10. The display device of claim 1, wherein the sampling switch is turned on in a partial period of the first sensing period and the second sensing period.

11. The display device of claim 1, wherein the first reference voltage line and the second reference voltage line are not electrically connected to each other in the first sensing period and the second sensing period.

* * * * *